United States Patent Office 3,043,903
Patented July 10, 1962

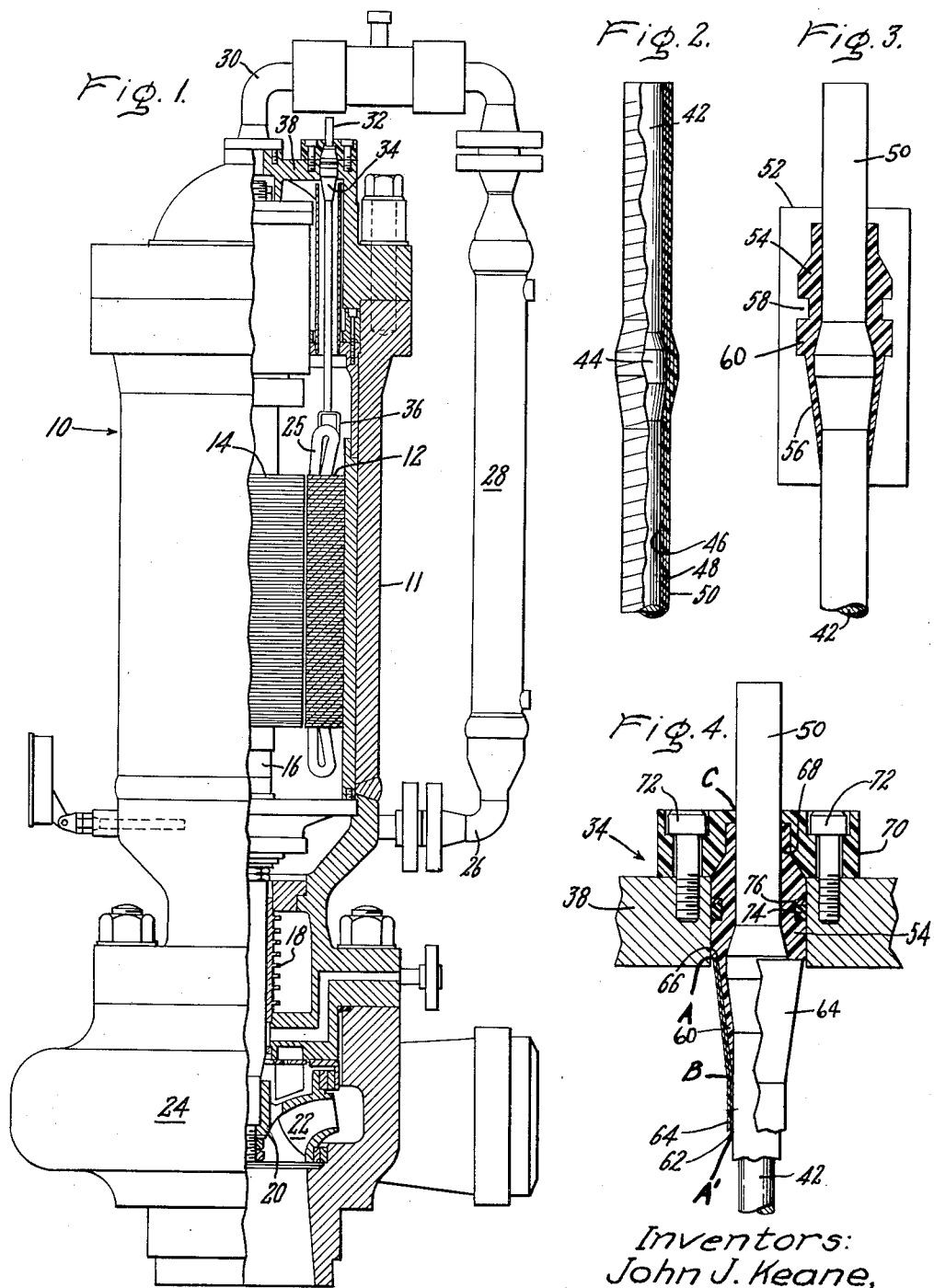

3,043,903
HYDROSTATIC LEAD SEAL AND METHOD
OF MAKING SAME
John J. Keane, Guilderland, N.Y., and Harold Kitson,
Jr., Ambler, Pa., assignors to General Electric Company, a corporation of New York
Filed May 8, 1958, Ser. No. 734,029
10 Claims. (Cl. 174—152)

The invention described herein relates to insulated conductors and more particularly to a lead seal for an electric power cable adapted to extend through the walls of a receptacle containing hydrostatic pressures of great magnitude.

Many different types and variations of seals have been designed for leading current carrying conductors through walls of liquid-filled vessels, such as a transformer or a water heater, or through the pressure hull of a submarine, where the pressures range from substantially atmospheric to approximately 200 p.s.i. or greater. Seals made for this purpose are generally of a packing gland type wherein a bushing is employed for crowding or squeezing packing into a fluid-tight relationship with the walls of the vessel and the conductor or cable to provide a substantially leakproof joint. Likewise, insulation for electric cables adapted for use under high hydrostatic heads, such as submerged telephone cables, also are well known, but the insulation utilized for minimizing dielectric losses and for protecting the cable against infiltration by water, are usually bulky and preferably covered with an external armor coating, such as lead.

In the operation of boiler feed pumps of the type disclosed in the Kitson et al. application Serial No. 568,-615, filed February 29, 1956, and assigned to the same assignee as the present invention, water is circulated in intimate contact with the pump motor windings and the pressures prevailing within the pump housing are substantially the same as the pump discharge pressures, which may approach 2500 p.s.i. Since conductor leads for the windings must extend through the motor frame or housing, it is evident that the pressure drop across a lead seal utilized for carrying the conductor lead through the housing will be very great, and in the example mentioned, will be about 2500 p.s.i.

The principal problem involved in designing such a seal is that the build of insulation on the conductor lead must be maintained at a minimum to prevent deformation when subjected to such high compressive forces while simultaneously displaying desirable dielectric properties. These requirements also call for impermeable insulating materials wrapped in a manner to prevent ingress of liquid between lapped insulating layers and through the material on the conductor. That area of insulation on the conductor lead at its point of exit through the motor housing walls is particularly subject to deformation thereby improving the likelihood of decreasing the dielectric strength at a point where it is most needed. Also, by virtue of the high pressures involved, the seal must be designed to preclude establishment of surface leakage paths longitudinally of the seal, in addition to assuring substantial elimination of void areas to negative damage to the insulation from the effects of corona. Moreover, the lead seal must be of simple design, easily installed and serviced and economical in construction.

The primary object of our invention therefore is to provide a simply and economically designed lead seal characterized by its ability to effectively seal a current carrying conductor in an opening provided in the walls of a receptacle containing high hydrostatic pressures.

Another object of our invention is to provide a method for insulating a current carrying conductor in the area where it extends through a wall of a high pressure container in a manner to effectively provide an unusually long surface leakage path between superimposed layers of insulation.

In carrying out our invention, we increase the diameter of a conductor lead to provide a tapered portion at the point where it enters the wall opening in a high pressure container, such as a motor. Insulation consisting of dicumyl peroxide catalyzed polyethylene is wrapped along the length of the conductor including the tapered portion and is provided with an overlayer of electron irradiated polyethylene tape. A protective body of resinous material having an affinity for the insulation is molded over and bonded to the insulated tapered portion and is equipped with seal rings in its outer surface arranged to engage the exposed wall surfaces in the container opening. Additional layers of similar insulation are then wrapped over the resinous body to form a chemical and mechanical seal therewith and thus provide a long leakage path for liquid attempting to seep through the insulation from the high to low pressure sides of the motor. In order to resist pressures inside the container tending to force the conductor through the opening, a backing plate equipped with an inner conical-shaped cavity matched to the design of the resinous body protruding through the opening, encompasses the conductor and is rigidly secured to the container wall.

The subject matter which we regard as our invention is particularly pointed out and distinctly claimed in the concluding portion of this specification. Our invention, however, both as to organization and method of operation, together with further objects and advantages thereof, may best be understood by reference to the following description taken in connection with the accompanying drawing in which:

FIGURE 1 is a view in elevation, partly in section, illustrating a high pressure liquid system incorporating a lead seal as one of its components;

FIGURE 2 is a view in elevation, partly in section, showing the disposition of insulation during the early stages of forming the lead seal;

FIGURE 3 is a sectional view in elevation illustrating the configuration of parts after a resinous material is cast in a mold encompassing a portion of the insulated conductor; and FIGURE 4 also is a sectional view in elevation, showing the arrangement of various parts comprising the lead seal when it is installed in the wall of a container.

Referring now to the drawings wherein like reference characters designate like or corresponding parts throughout the several views, there is shown in FIGURE 1, a portion of a boiler feed pump system comprising a motor 10 including a housing or shell 11 and a stator 12 having a rotor 14 positioned for electrodynamic cooperation therewith. The shaft 16 of the rotor extends through a thermal barrier 18 and terminates in a direct connection to shaft 20 carrying impeller vanes 22 of a high pressure pump 24. Heat generated in the motor during operation is dissipated in a liquid coolant arranged to circulate around the end turns of winding 25 and between the stator core and the motor housing or shell. The liquid usually is water and is circulated by means of a motor-connected pump, separate from pump 24, which moves the coolant downwardly past the operating parts and into pipe 26, heat exchanger 28 and pipe 30 prior to discharge into the motor shell where the cycle is repeated. In the usual case, a pressure of approximately 2500 p.s.i. is imparted to the coolant and all parts within the motor are therefore subjected to this pressure. Since the conductor leads connected with the stator windings must be carried through the shell 11, the pressure existing therein tends to deform the insulation on the conductor leads thereby to form leakage paths in the insulation and past a seal used in forming a watertight fit between the leads and walls of the shell. The pressure also is effective in creating a force against the seal to move it in an outward direction.

In order to overcome the adverse effects created by the unusually high forces acting on the sealing means, the conductor leads 32 are insulated in the manner hereinafter described, and led through a seal generally designated 34 for attachment to winding 25 at 36. The seal 34 affixed within the wall 38 and employed for providing a watertight fit therewith, is of a high pressure type and generally consists of multiple layers of organic material taped on a conductor and surrounded by a resin body which in turn is encompassed by additional layers of insulation, thus effectively preventing the establishment of both water and electric current leakage paths through the insulated seal body.

Referring more specifically to the seal shown in FIGURES 2, 3 and 4, the conductor lead 32 comprises a copper stud 42 equipped with an integrally formed tapered sleeve 44, or a similarly shaped sleeve attached to the stud body by a shrink or other fit. In forming the seal, the copper of the conductor lead is thoroughly cleaned and an initial layer of dicumyl peroxide catalyzed polyethylene 46 is half-lapped over on the full length of the lead. An overlayer of electron irradiated polyethylene 48 is half-lapped over the catalyzed polyethylene to provide a base layer of insulation of the type illustrated in FIGURE 2. Since this insulation is applied to the stud 42 before it is attached to the windings 25, a layer of polyethylene terephthalate film 50 is applied over the base layer of insulation and the resultant product then cured for approximately one hour in an oven at a temperature of 150° C. The heat for this period of time is sufficient to cause the polyethylene terephthalate to shrink and exert a compressive force on the layers therebeneath, thereby causing the catalyzed polyethylene to flow and the irradiated polyethylene to soften and thus provide a homogeneous mass of insulating material uniformly disposed on and thoroughly bonded to the copper surface of the stud 42 positioned therebeneath. Upon completion of the curing cycle the sacrifice taping of polyethylene terephthalate film 50 is removed to expose a smooth surface free of any indentations or protuberances previously made by the overlapping layers of tape insulation.

As illustrated in FIGURE 3, the next step in the process of forming the seal consists in placing the insulated stud 42 in a mold 52 for casting a resinous material 54 over the tapered portion shown. Prior to doing so however, it is preferable to oxidize the outer insulating layer of irradiated polyethylene 48, and although any compound may be employed for this purpose which will not adversely react with the insulating materials, it has been found that the application of a concentrated sulfuric acid solution of potassium dichromate to the insulation for approximately three minutes effectively provides the desired degree of oxidation.

The mold 52 has an internal configuration shaped to the desired dimensions of the seal body and reference to the drawings will show that the opposite ends have openings just sufficient to receive the insulated ends of the stud 42. A cavity 56 is formed around the tapered portion of the stud and an inwardly protruding ring 58 serves to provide a groove for the later reception of O-rings after the casting is set. When the stud is located in position in the mold, a material, preferably an epoxy resin 54, is poured or otherwise introduced into the mold cavities to fill all spaces and assume the profile shown in FIGURE 3. In order to remove any air existing in the liquid resin, the complete mold is placed in an air evacuation device and subjected to a vacuum in a well known manner. Curing of the resin is then accomplished by heating the mold with its insulated stud at a temperature of 175° C. for approximately 15 hours, whereupon, the stud is removed from the mold body for further treatment. The proper selection of materials results in establishment of a firm bond between the resin and exposed layer of irradiated polyethylene 48 thereby precluding seepage of liquid between these two outer layers of material.

Since it is desirable to provide a clean surface to which subsequent layers of insulation will adhere, the exposed surface of the resinous material 60 is treated with a small amount of hot sulfuric acid followed by a water rinse and application of a thin coat of dicumyl peroxide from solution. A layer of catalyzed polyethylene 62 is then half-lapped on the insulation 48 and the resin body 60, terminating at its upper end against shoulder 66. An overlayer of electron irradiated polyethylene 64 is subsequently applied in the same manner as previously described. Sacrifice layers of silicone rubber tape and polyethylene terephthalate are then wrapped over the complete length of the layers of material on the stud 42. The completely assembled lead seal is again cured in an oven at 160° C. for approximately one hour. The polyethylene terephthalate shrinks during the cure cycle thus causing the catalyzed polyethylene to flow and the irradiated polyethylene to soften and partially shrink, thus filling all the voids and forming a completely homogeneous integrally bonded product. Upon completion of the cure cycle the sacrifice tapes of rubber and polyethylene terephthalate film are removed from the insulation layers therebeneath to provide a seal adapted for installation in wall 38 of the shell for the motor.

The above described method employed in forming the lead seal has been directed to the specific application of specific materials for illustrating the invention. It is apparent that other materials may equally well be used as substitutes for those disclosed above and it is to be understood that they likewise fall within the spirit and scope of the invention. For example, substitutes for the dicumyl peroxide catalyzed polyethylene may consist of hydrocarbon polymers, for example, butadiene styrene, or a product having affinity for both the metallic conductor which may comprise copper, aluminum or the like, and the electron irradiated polyethylene, and which will flow under heat and pressures in the neighborhood of 125° C.–160° C. and 25–100 p.s.i.

Substitutes for the irradiated polyethylene may comprise any semi-crystalline hydrocarbon polymer having a melting point in excess of 80° C. and which is hydrolytically and thermally stable, for example, polypropylene, linear polymers, crystalline polystyrene or non-crystalline hydrocarbon polymers capable of being cross-linked, for example, polybutadiene, polyisoprene styrenated synthetic rubbers.

Substitutes for the filled epoxy resins may comprise any thermoset resin, that is, one having the necessary dimensional stability properties to resist flow at about 80° C. under approximate 2500 p.s.i. load.

Alternatives used in oxidizing the surface of the irradiated polyethylene may comprise any product capable of oxidizing the surface such as a mixture of potassium dichromate and sulfuric acid, aqua-regia, or hot nitric acid.

Prior to the application of insulating layers to the resin, the surface may be treated with hot sulfuric or nitric acid or sandblasted.

Upon removal of the sacrifice tapes, the encapsulated stud 42 is ready for installation in the wall 38 of the motor shell 11. The end 68 of the resin body 54 tapers inwardly toward the stud on the low pressure side of the motor shell to provide a large surface area adapted for engagement by complementary walls formed interiorly of a melamine glass block 70. The block is attached to the motor shell by bolts 72 and preferably is made of insulating material with dimensional stability at 80° C. including resistance to flow, resistance to shear stresses and it should not be electrically conductive at high humidities. Other blocks displaying these characteristics are likewise suitable for use. The tapered angles on the block and the resin body are intentionally selected since this arrangement is effective in counteracting the pressures inside the motor shell tending to force the lead seal out of the opening in wall 38.

Reference to FIGURE 4 will show that two paths exist in the lead seal, when installed in the motor shell, through which pressures existing inside the motor can be dissipated. These comprise a first path extending along the shell wall 38 between the wall and the resin body 54, while the second extends between the base layer of insulation and the inner surface of the resin body. Leakage along the first path is prevented by the use of an O-ring 74 and leather washer 76 compressed in the groove provided in the outer surface of the resin. The 2500 p.s.i. pressure inside the shell tends to deform insulating material but the chosen insulating components and the method followed in making the seal provide a hard compact mass which effectively negatives such deformation from occurring. As a result, liquid cannot penetrate through the various layers to the conductor and it cannot seep longitudinally of the seal because of the firm bond established between the compatible insulating materials. In order to prevent establishment of a leakage path for electric current, the resin body is shaped to extend a considerable distance in a direction inside the motor shell. Consequently, an extremely long path for electron flow exists and extends from point A inwardly to point B, or from A' to B, thence along the complete length of the stud to point C. In practice, this lead seal has proven successful in service and has eliminated impediments heretofore existing in installations where current carrying conductors must be led through a wall of a high pressure container.

In view of the above, it will be apparent that many modifications and variations are possible in light of the above teachings. It therefore is to be understood that within the scope of the appended claims, the invention may be practiced otherwise than as specifically described.

What we claim as new and desire to secure by Letters Patent of the United States is:

1. A seal for sealing electrical conductors in a wall of a shell subjected to internal pressures comprising an insulated conductor lead extending through an opening formed in a wall of said shell, a body of resinous material bonded to the insulation disposed on said conductor lead and fitted within the wall opening provided in said shell, said resinous material tapering outwardly from a point inside said shell and reaching its greatest diameter at the wall of said shell where it is fitted in fluid-tight relationship therewith, said resinous material further tapering inwardly towards said conductor lead at a point outside said shell, a groove filled with an O-ring provided in the area of greatest diameter of resinous material and coacting with the wall at the opening in the shell for preventing fluid leakage outward between the resinous material and the shell wall, a non-conductive glass-filled resin block having a central opening encompassing said conductor lead and being equipped with a tapered surface matching the inwardly tapered surface of the resin material, means securing said block to said shell for preventing the forces inside said shell from moving said conductor lead outwardly therefrom, and a layer of insulation bonded to the outer surface of said resinous material located on said conductor inside said shell and being effective in establishing a long leakage path for electric current and for seepage of water between the layer of insulation and the resinous material.

2. A seal for sealing electrical conductors in a wall of a shell subjected to internal pressures comprising a conductor lead extending through an opening formed in a wall of said shell, a base layer of insulation on said lead made from a hydrolytically and thermally stable hydrocarbon polymer, a filled resin body of material bonded to said insulation and extending a substantial distance in opposite directions from the wall of said shell, said resin material being provided with a smooth outwardly tapered surface inside said shell and terminating in a diameter of uniform size equal to the length of the opening in said wall for forming a fluid-tight fit therewith, a tapered portion on said resin material extending outwardly from said shell, and a backing member equipped with a tapered portion the inverse of the tapered portion on the resin material for counteracting the effect of fluid forces in said shell on said conductor, and an outer layer of insulation covering said resin material positioned within the shell and being made of a material the same as the base layer of insulation.

3. A seal for sealing electrical conductors in a wall of a shell subjected to internal pressures comprising a conductor lead extending through an opening formed in a wall of said shell, a metallic sleeve attached at the point where said lead enters the opening provided in said shell, and sealing means securing said member in said wall opening, said sealing means comprising a base layer of insulation on said conductor lead comprising a layer of dicumyl peroxide catalyzed polyethylene having an overlayer of electron irradiated polyethylene which has been subjected to a heat and pressure treatment to provide a single layer of insulation bonded firmly to said member and presenting a smooth and uninterrupted exposed surface, a resin-filled material bonded to said base layer of insulation and extending from a point inwardly of said shell to a point exteriorly thereof, a groove provided in the resin material along the length of the wall opening and an O-ring fitted within said groove for preventing leakage of fluid from the inside of said shell to the atmosphere, and a glass-filled resin block surrounding said member and attached to the exterior surface of said wall for preventing movement of said sealing means outwardly when subjected to the forces existing inside said shell, and an outer layer of insulation bonded to the resin material located on the inside of said shell for establishing a long leakage path for the flow of electric current and seepage of water through the sealing means.

4. A seal for sealing electrical conductors in a wall of a shell subjected to internal pressures comprising an insulated current conductive member extending through a wall of said shell a seal in intimate contact with said conductive member and the wall of said shell for preventing escape of the high pressure fluid to the atmosphere, said seal comprising a base layer of insulation on said member made from a hydrocarbon polymer having a melting point in excess of 80° C. and which is hydrolytically and thermally stable, a filled resinous thermoset material capable of withstanding pressures greater than 500 p.s.i. placed in intimate contact with said base layer of insulation, an outer layer of insulated over said resinous material having the same characteristics as the materials in said base layer of insulation, and a supporting member surrounding said conductive member and attached to said shell for resisting forces tending to displace said seal from said housing.

5. The method of forming a lead seal used in carrying a lead through a wall of a high pressure receptacle comprising the steps of applying a protective coating on the external surface of said lead, selecting a material capable of forming a bond with the coating and casting said material around the lead and for a distance along its length greater than the thickness of said wall, forming a groove in the peripheral surface of the material, bonding a smooth outer coating on the material for preventing fluid seepage between the material and said coating as a result of high pressures within the receptacle, inserting packing in said groove and positioning the lead with the coverings thereon in an opening provided in the wall of a high pressure receptacle, and attaching a securing member to the exterior surface of the receptacle in a manner to have it bear against the material thereby to prevent ejection of the covered lead through the opening by high pressures within the receptacle.

6. The method of forming a lead seal used in carrying a lead through a wall of a high pressure receptacle comprising the steps of providing a taper on the body of the lead, applying a thin layer of insulation of high dielectric strength over said taper and along the length of the lead for a distance equal to several times the thickness of said wall, selecting a material having properties compatible with the insulation to effect a secure bond therebetween and casting sad material around the taper and along the length of said lead, providing a tapered portion on said material on the exterior side of said receptacle, wrapping a layer of insulation over the material located on one side of the sleeve, and positioning the conductor lead with its coverings thereon in an opening provided in a wall of the receptacle and in fluid-tight engagement therewith, and securing to said receptacle a plate coacting with the tapered surface of said material for preventing ejection of said lead from the receptacle when subjected to the high pressures existing therein.

7. The method of forming a lead seal used in carrying a conductor lead through a wall of a high pressure receptacle comprising the steps of affixing a metallic tapered sleeve to the body of said conductor lead, applying insulation on the sleeve and extending it in opposite directions from thhe sleeve on the conductor lead, subjecting the insulation to heat and pressure to obtain a firm bond between the surface of the conductor lead and the insulation and to provide a smooth exterior surface on the insulation, selecting a resinous material having properties capable of forming a bond with the insulation and casting said material over said sleeve and along the length of the conductor lead, shaping the exterior surface of the resinous material to a shape conforming with the exposed wall portions provided by an opening in the receptacle and tapering it toward the lead in opposite directions from the sleeve, applying a layer of insulation over that portion of the resinous material on one side of the sleeve to provide a long path for electric current and seepage of fluid through the sealed components, and affixing a plate to the outer wall of the receptacle and in contact wtih the other tapered portion of resinous material thereby to prevent ejection of the conductor lead with its coverings from the opening as a result of high pressures within said receptacle.

8. The method according to claim 7 wherein a groove is provided in the peripheral surface of the resinous material at a point where the material is in engagement with the exposed wall portions provided by said opening for proving a fluid-tight fit in the receptacle wall.

9. The method of forming a lead seal used in carrying a conductor lead through a wall of a high pressure receptacle comprising the steps of shinking a metallic sleeve onto a portion of a conductor lead at a point where the conductor lead enters an opening provided in a wall of a receptacle, applying a layer of insulation along the length of said conductor lead comprising a first layer of insulation consisting of dicumyl peroxide catalyzed polyethylene having an overlayer of electron irradiated polyethylene, subjecting said layers to temperature and pressure to obtain a base layer of insulation firmly bonded to the surface of the conductor lead and displaying a smooth exterior surface, selecting a filled resin material having properties compatible with the layer of insulation to effect a firm bonding action when cast in contact therewith, casting said resin material over said sleeve and along the length of the conductor lead, shaping the exterior surface of the resin material to a configuration the same as a wall opening in which the conductor lead is to be placed and further providing a tapered surface on the conductor lead on opposite sides of the receptacle wall, applying a layer of insulation on the resin material of the same quality and character as the base layer of insulation, inserting the conductor lead with its coverings in said wall opening and attaching a plate on the exterior wall of the receptacle in a manner to engage the resin material and thereby prevent its ejection from the receptacle as a result of high pressures existing therein.

10. The process according to claim 9 wherein the pressure individually applied to the base and outer layers of insulation is obtained by utilizing a sacrifice tape displaying properties of high force of recovery when subjected to an elevated temperature.

References Cited in the file of this patent

UNITED STATES PATENTS

| | | |
|---|---|---|
| 2,169,967 | Smth | Aug. 15, 1939 |
| 2,174,377 | Bowden | Sept. 26, 1939 |
| 2,311,805 | Yost | Feb. 23, 1943 |
| 2,470,066 | Calabrese | May 10, 1949 |
| 2,563,829 | Fitzgerald | Aug. 14, 1951 |
| 2,598,547 | Ivanoff | May 27, 1952 |
| 2,624,286 | Smith | Jan. 6, 1953 |
| 2,658,130 | Bondurant | Nov. 3, 1953 |
| 2,742,582 | Bahn | Apr. 17, 1956 |
| 2,750,436 | Richter | June 12, 1956 |
| 2,757,355 | Howes et al. | July 31, 1956 |
| 2,838,596 | Foord | June 10, 1958 |
| 2,864,883 | Townsend | Dec. 16, 1958 |
| 2,894,055 | Clark | July 7, 1959 |